April 17, 1962
H. J. LEHTI ET AL
3,030,623
METHOD FOR MAKING BLOWN RUBBER
Filed Nov. 21, 1957
2 Sheets-Sheet 1
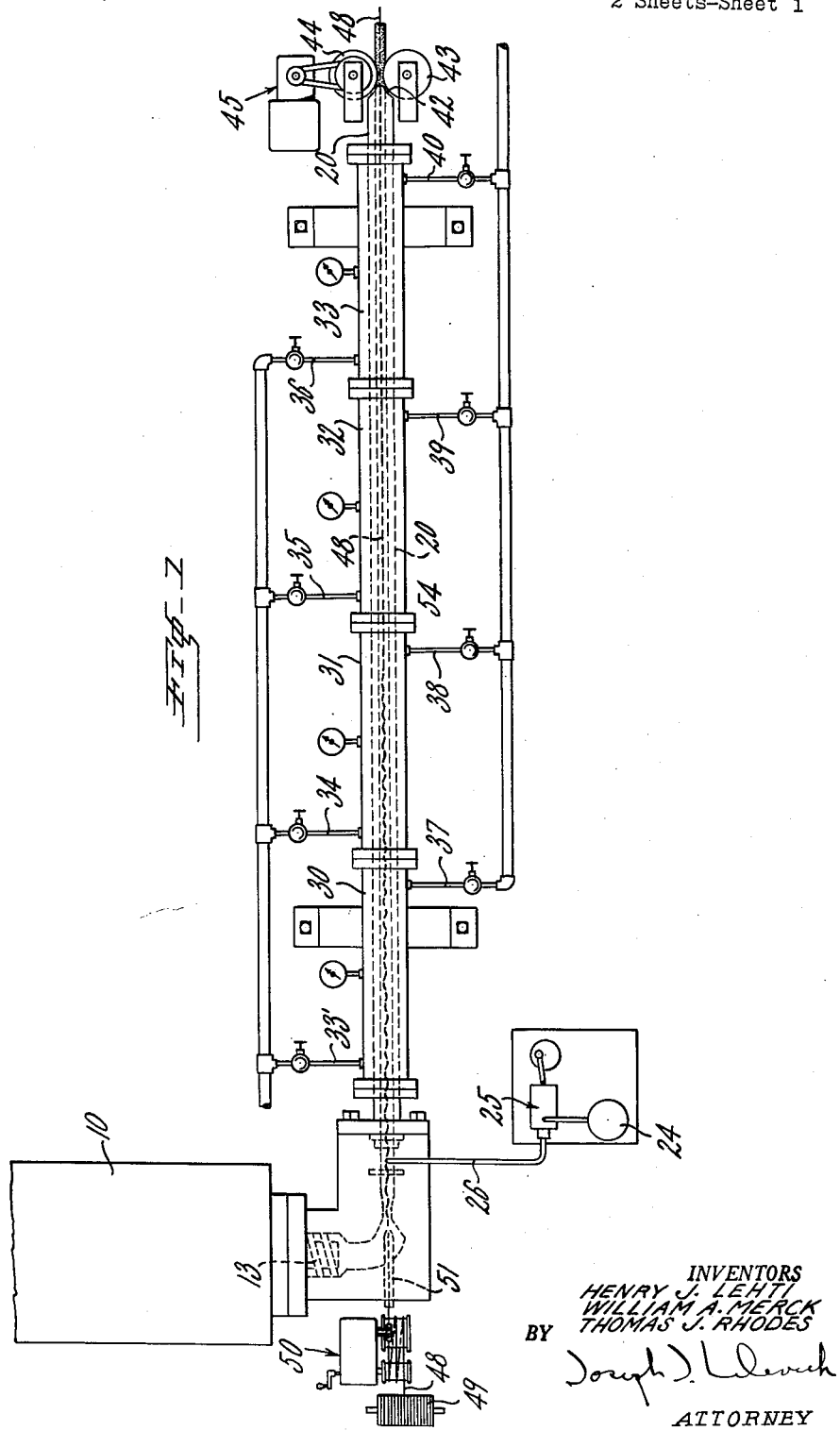
INVENTORS
HENRY J. LEHTI
WILLIAM A. MERCK
THOMAS J. RHODES
BY
*Joseph J. Llevich*
ATTORNEY

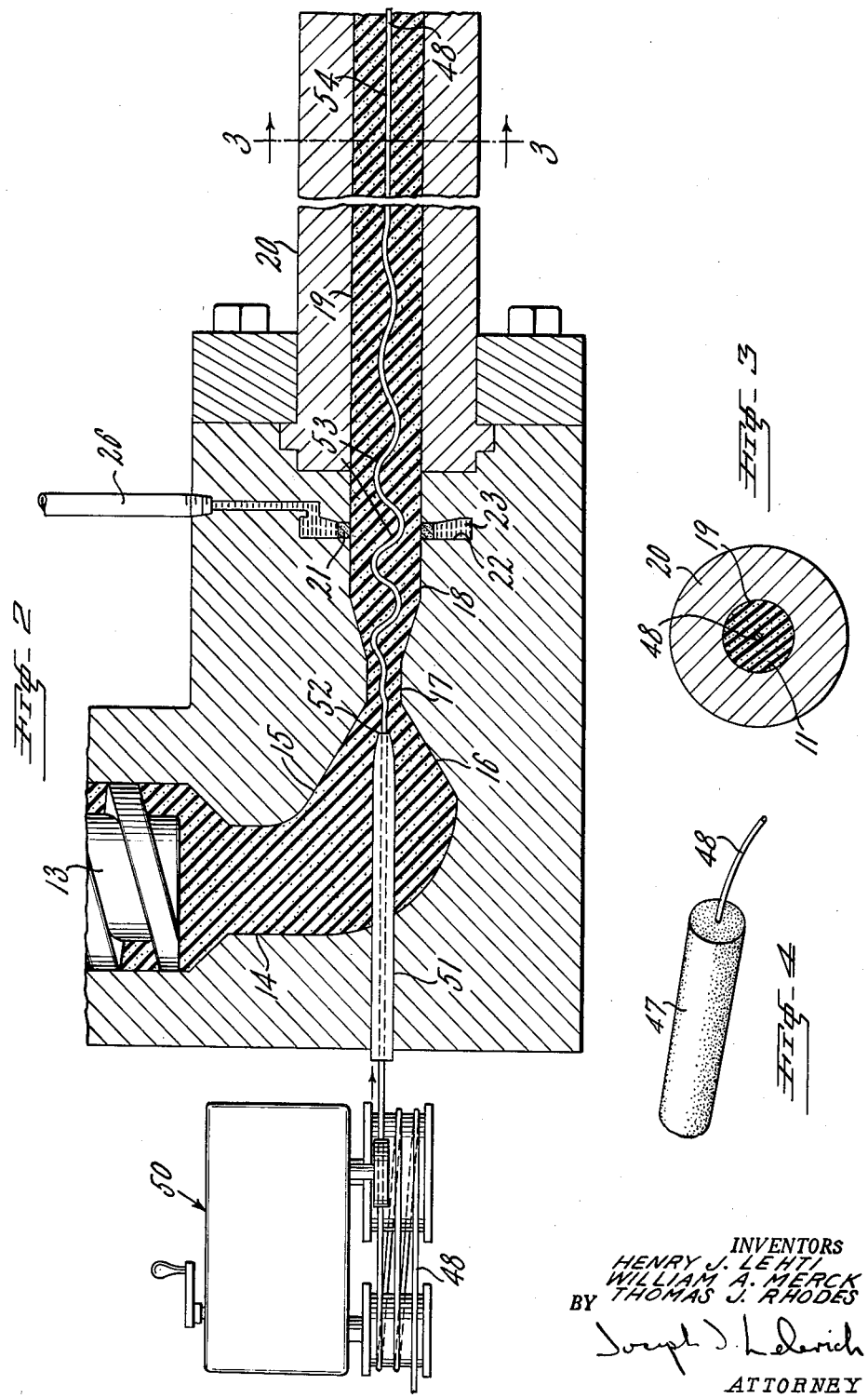

United States Patent Office 3,030,623
Patented Apr. 17, 1962

3,030,623
METHOD FOR MAKING BLOWN RUBBER
Henry J. Lehti, Bronx, N.Y., and William A. Merck, Rutherford, and Thomas J. Rhodes, Kinnelon, N.J., assignors to United States Rubber Company, New York, N.Y., a corporation of New Jersey
Filed Nov. 21, 1957, Ser. No. 697,918
2 Claims. (Cl. 18—59)

This invention relates to a method for continuously expanding, shaping and curing rubber products containing a blowing agent while simultaneously reinforcing said products by the insertion therein of a relatively inextensible fibrous reinforcing material. More specifically, our invention discloses a new and novel method for the insertion of a relatively inextensible reinforcing material in the interior of a blown rubber product, said insertion occurring during the extrusion and blowing process while said rubber is being expanded, shaped and cured.

It is well known in the art that a blowing agent may be added to a rubber and upon the addition of heat, the said blowing agent will decompose liberating an inert gas in the interior of the rubber and forming the familiar sponge rubber structure. Various fillers and softeners may be added to the rubber as desired. After the blowing agent is released, the sponge rubber is cured. It is desirable that the vulcanization accelerators employed be selected so that vulcanization will not begin until the blowing reaction has ceased. This is usually accomplished by selecting an accelerator having a slow rate of initial activity or else by selecting an accelerator that will react only at a temperature higher than that at which the blowing agent will decompose and using multiple heating zones.

Typical blowing agents are sodium bicarbonate and diazoaminobenzene although there are many others that are equally satisfactory.

Depending upon the type of blowing agent and the type of starting materials, the rubber formed will either be of the sponge type, having interconnected pores or of the cellular type having non-interconnected pores. The method and means for obtaining either one of the two types is well known to the art and is not to be construed as being within the scope of this invention. When hereinafter we refer to sponge rubber we shall be referring to both types hereinabove mentioned.

There are many applications in industry for elongated strips and rods made out of such sponge rubber. Such strips and rods are often required to be of a definite shape and cross-sectional area. Due to the inherent weakness of sponge rubber with respect to its tensile strength, it is desirable to reinforce such sponge strips by incorporating laterally through the center thereof and intimately bonded thereto a relatively inextensible but flexible reinforcing material of a fibrous nature such as a string or cord or monofilament or other textile element.

One of the objects of our invention, among others to be herinafter set forth in this specification, is the insertion of the reinforcing element during the extrusion process.

A method of forming linear sponge articles has been disclosed in commonly assigned copending U.S. application, S.N. 703,222, filed on instant date herewith.

The specifications of said application are hereby incorporated by reference into this application insofar as they are pertinent. A method is disclosed therein of extruding continuous linear sponge objects by continuously extruding rubber stock through a shaping die into a curing tube, said rubber emerging from the die and completely filling said curing tube circumferentially. Upon the application of heat, the blowing agent incorporated within the rubber is decomposed and the rubber expands due to the evolution of gas. Since the rubber is confined circumferentially, the only direction for expansion is in the linear direction. Thus there is a decrease in density of the rubber but an increase in linear velocity. It is apparent that if the reinforcing string were to enter the curing tube at the same point and at the same rate as the rubber stock, upon the expansion of the rubber stock, the rubber stock would increase in linear velocity, but the string being relatively inextensible would not increase in velocity. The ratio of speeds is at times on the order of 3:1. It is obviously necessary to insure in some way that the linear velocity of both string and rubber remain essentially equal throughout the length of the curing tube in order to insure intimate bonding of the sponge to the string.

We have discovered that if the stock together with the string is fed through an extrusion orifice having a smaller cross sectional area than the subsequent curing tube, there will be compensation for the increased volume and consequential accelerated progress of the stock through the tube due to the action of the blowing agent and as a result, the string and rubber stock will always be moving at approximately the same linear velocity.

The rubber stock enters the constricted die at the same volume per unit time as it enters the curing tube but because of the constricted area, the linear speed of the stock increases and since the string is fed to the die at this point, the stock and string will proceed through the die at equal speeds. Upon emergence from this constricted die, the stock will again slow down, but the string being inexpansible will bunch up forming folds throughout its length. When heat is applied and the rubber begins to expand linearly due to blowing, the string will gradually straighten out. The linear expansion of the rubber stock due to blowing will be accompanied by a straightening out of the folds in the string resulting finally in a taut string firmly bonded in the interior of the sponge product. The action of the constricted die is similar in action to a venturi in a fluid system.

Further refinements and details of our invention will become readily apparent from the following description designed to be read in conjunction with the accompanying drawings wherein:

FIG. 1 illustrates the entire extrusion and curing operation;

FIG. 2 is a more detailed view of the extrusion die area illustrating the method of compensation;

FIG. 3 is a section through line 3—3; and

FIG. 4 is a partial perspective view of the final product.

A typical sponge rubber stock recipe is:

| Ingredients: | Parts, dry weight |
|---|---|
| Elastomer | 100 |
| Whiting | 100 |
| Stearic acid | 12 |
| Paraffin oil | 20 |
| Zinc oxide | 5.0 |
| MBTS (di-2-benzothiazyl disulfide) accelerator | 1.0 |
| Methazate (zinc dimethyl dithiocarbamate) accelerator | 0.25 |
| Beutene (condensation product of butyraldehyde-aniline) accelerator | 0.1 |
| Sulfur | 3.0 |
| Unicel S (blowing agent) (du Pont's trade name for $NaHCO_3$ in mineral oil) | 5.0 |

Referring to FIG. 2, the rubber stock having incorporated therewith a blowing agent is forced under the influence of screw 13 into chamber 14 and thence through constricted die portion 17. In the particular embodiment illustrated, the extrusion chamber or passage 14 gradually curves to form essentially a right angle bend 15 and thereafter gradually tapers inward as at 16 to form the constricted die portion 17 that is maintained for a short distance of about one half inch. The extrusion passage after this constriction tapers outwardly until it again reaches a definite size as at 18 corresponding to the shape desired of the final product.

The extrusion passageway 18 of final size within the extrusion head leads into a similar passageway 19 contained within a greatly elongated curing tube 20 that is secured to the delivery end of the crosshead. The passageway 19 provides a continuation of the passageway 18 in which the rubber initially acquired the desired shape, and serves as an elongated confining chamber in which blowing and vulcanization of the rubber takes place. Shortly after the rubber stock enters the portion 18 of the crosshead passageway in which it acquires its final shape, said rubber stock passes in contact with a lubricating ring 21 containing a porous material, such as porous bronze or felt, mounted in the interior surface of the extrusion passageway. An annular distributing passageway 22 surrounds the radial outer surface of the lubricating ring for the purpose of supplying it with a liquid lubricant 23 that is delivered under pressure from an external supply tank 24 (FIG. 1) by means of a pump 25 and a connecting line 26 leading into the extrusion head. By means of this arrangement, there is continuously applied to the surface of the advancing shaped rubber stock, as it proceeds into the elongated confining chamber, a thin film of a liquid lubricating substance that serves to prevent frictional engagement between the rubber stock and the walls of the confining chamber, and thereby facilitates passage therethrough. Suitable lubricants for this purpose include antisticking liquids that are not injurious to the rubber, such as but not necessarily limited to glycerin, soap solutions, certain oils, wetting agents, and compositions containing silicone lubricating bodies.

As shown in FIG. 1, the elongated die tube 20 is provided with four successive external heating jackets 30, 31, 32 and 33, through each of which there is circulated steam or other suitable heat transfer media, by means of independently operated inlet lines 33', 34, 35 and 36, respectively, and outlet lines 37, 38, 39 and 40, respectively. The heating jackets are maintained at temperatures suitable for the material used. Thus, for the example heretofore given, since Unicel S begins to decompose at 250° F., it is preferred that the first jacket 30 have a temperature of 275° F., jacket 31 a slightly lower temperature of 250° F. to permit full decomposition of the blowing agent before curing, the third jacket 32 a temperature of 275° F. and the fourth (33) a temperature of 325° F. Three jackets or less can be used where feasible. Where only three are used with the material of the example a temperature of 275–325° F. in the third jacket 32 is suitable. Other methods of heating may be used as well. The purpose of using multiple heating zones is to first bring the temperature up to where the blowing agent decomposes and then to increase the temperature until the curing temperature is reached. One heating zone only would be sufficient if the vulcanization accelerator used is selected from those having a slow rate of initial activity so that it will not begin to act until the blowing reaction has ceased.

The exit end of the elongated tube is cut away in a curved shape 42 at each side and such curved surfaces are closely adjacent a pair of pinch rollers 43, 44 having a similar radius that are driven at a definite rate by a variable speed drive mechanism 45. The finished product passes between the pinch rolls 43, 44 as it emerges from the tube, as is hereinafter described in greater detail and it may be dropped into a suitable container, or wound up on a suitable reel.

The finished product includes a central reinforcing string 48, which becomes adhered to the rubber in the course of the vulcanization. Such string is introduced to the extruder from a supply reel 49 with the aid of a variable speed capstan drive 50 located in front of the crosshead. The string passes into a hollow tube or needle 51 extending from the reel of the crosshead and axially into the extrusion passage 14, where it terminates at a point 52 spaced immediately before the restricted die passage 17. As the string emerges from the end of such hollow needle, it is carried along by the rubber streaming through the restricted passage 17. Since the cross sectional area of the rubber in the restricted passage 17 is less than that of the rubber in the subsequent larger passage 18, the linear speed of the rubber will decrease at it enters the larger passage, and the subsequent slowing down of the string will cause a temporary excess of string to be provided at this point and it will bunch up, forming folds 53 in the string in the passageway 18 and in the first part of the elongated tube 19. In subsequent zones of the curing tube, such as the zone surrounded by the posterior heating chambers, 31, 32 and 33, in which the stock assumes a blown condition, the linear speed of the rubber increases due to expansion caused by the blowing action and the string then straightens out to assume a straight line 54, from which the folds 53 have been removed.

From the foregoing, it will be apparent that the restricted preliminary die passage 17, in combination with other features of the apparatus, affords a means of compensating for the necessary differential between the speed of the string in the blown rubber, and the slower speed of the rubber in the initial part of the elongated confining tube, before the blowing takes place. For this purpose it will be found that definite relationships must be maintained between the cross-sectional area of the restricted preliminary die and the cross-sectional area of the elongated tube having the shape of the final article. The ratio of the preliminary die area to the final tube area should be at least the ratio of the volume of the stock before blowing to its volume after blowing. In practice, it is found that the best results are obtained if the ratio of the final area to the restricted area is greater than the ratio of the volume of the blown stock to the ratio of the unblown stock. For example, if the volume ratio of the blown to unblown stock is 3:1, then the ratio of the curing tube area to the constricted area is most suitably greater than 3:1, say, 4:1, or even as high as 5:1 or 6:1. To prevent such high ratios from resulting in an undesirable excess of string being fed into the extrusion machine, the capstan arrangement 50 is carefully regulated to limit the actual entrance speed of the string to the speed of withdrawal of the product. For this purpose, the capstan can be provided with a slip clutch (not shown) which is adjusted to exert a steady backward pull on the string and yet slip during spurts of the stock to prevent breaking of the string or puckering of the stock. This means that with such high ratios the rubber stock within the restricted passageway 17 will actually be moving somewhat faster than the string at this point, but no difficulty results because the heated, uncured stock at this point is quite plastic, and relative slippage between the rubber stock and the string takes place readily, in accordance with the speed of the capstan.

Pinch rollers, 43 and 44, at the outlet of tube 20 stabilize the output rate of the stock. Theoretically, they should be set at a rate of speed which is that of the stock passing through die 17; if the blowing agent expands the volume of the stock to three times its unblown volume, the rate out of tube 20, or through die 17, will be three times the rate immediately after entrance into tube 20, and theoretically the cross-sectional area of tube 20 should be three times that of die 17.

If no irregularities occurred in the progress of the stock due to variations in the blowing agent, lubricant, heat, or to other causes, it is doubtful if either pinch rollers or capstan to stabilize the rate of feed of the string would be necessary. But, because such irregularities are generally unavoidable due to inherent imperfections in mechanical devices, stabilizing both the rate of finished stock emerging from the machine and the intake of string insures a better product.

The pair of pinch rollers, 43, 44, above mentioned, both of which are driven and controlled by a variable drive such as a Reeves' drive, approximately 6" in diameter and each roller set about 1/16" from an arcuate cut-out of a radius of 3" to correspond with the pinch rollers at the outlet of tube 20 (and 1/8" from each other in the production of general utility rod or strip) stabilizes the rate of output very well. When the stock tends to move too fast, the pinch rollers hold it back, or when the tendency is for it to go too slowly, they pull it out at a uniform rate, thereby controlling cure, cellular structure, and density.

The pinch rollers and capstan for string feed may be independently regulated or they may be synchronized and regulated by a common control which would simultaneously alter the speed of both. In operation, one might set the speed at the lowest blow ratio expected and gradually make such adjustment as appear wise in the course of operation. Finer subsequent adjustments may easily be made.

A second capstan may be placed after the pinch rollers and synchronized with them to provide greater surface contact with the emerging stock and thereby assist the pinch rollers. Such assistance may be needed when unusually irregular cross-sectional stock is being made since such stock meets greater resistance from the walls of the tube. Such capstan is also useful as an intermediate device between the pinch rollers and a spool upon which the strip or rod is wound. The capstan may replace the pinch rollers entirely for certain operations.

While our invention has been described in terms of a specific embodiment and a specific composition of rubber stock it is to be understood that such description is for purposes of convenience of presentation and is not to be construed as a limitation of the scope hereof. It will be easily apparent that changes may be made without departing from the spirit of our invention which is to be limited only by the claims appended hereto.

Having thus described our invention, what we claim and desire to protect by Letters Patent is:

1. A method of continuously producing blown rubber in long uninterrupted lengths of definite cross-sectional shape, comprising in combination the steps of extruding a vulcanizable rubber sponge stock under pressure through a restricted die, and thereafter through a greatly elongated heated tube having a larger cross-section corresponding to the size and shape of the finally desired product to substantially fill said elongated tube circumferentially, the ratio of the cross-sectional area of the elongated die to that of the restricted die being at least as great as the ratio of the volume of the stock after blowing to the volume before blowing, introducing a string to the interior of the stock within the restricted die at a speed substantially equal to the speed the string emerges from the said elongated tube, whereby the speed of the string in the forepart of the elongated tube will be less than the speed of the string in the restricted die and whereby the string will fold at a plurality of points after leaving the restricted die, blowing and vulcanizing the stock within the elongated die whereby the stock expands longitudinally and the string thereby unfolds as it is carried by said stock, and stabilizing the rate of emergence of the thus blown and vulcanized rubber stock from the elongated die to regulate the degree of blowing of the stock and to maintain the stock under a definite pressure within the die.

2. In the method of continuously producing long uninterrupted lengths of blown rubber having a definite cross-sectional area and having a flexible, substantially inextensible fibrous reinforcing element embedded therein comprising shaping a rubber stock containing a blowing agent and thereatfer heating the said stock to cause expansion and vulcanization, the improvement which perimts said stock to expand in the direction of its length without causing the fibrous reinforcing element to be subjected to undue tensile stress comprising: extruding the said stock under pressure into a preliminary restricted passageway while simultaneously introducing the said fibrous reinforcing element into said stock in the restricted passage and thereafter passing said string and stock into an elongated annular pasageway having a cross-section corresponding to the cross-sectional configuration desired of the final product to fill said annular passageway circumferentially, the said fibrous reinforcing element being introduced at a speed substantially equal to the speed the fibrous reinforcing element emerges from the forepart of said elongated passageway, whereby the speed of the fibrous reinforcing element in the said elongated passageway will be less than the speed of the fibrous reinforcing element in the said preliminary restricted passageway and whereby the fibrous reinforcing element will fold at a plurality of points after leaving the restricted passageway thereafter applying heat to cause the said stock to expand longitudinally in the elongated passageway and to thereafter become vulcanized whereby the fibrous reinforcing element unfolds as it is carried by said stock; the ratio of the cross-sections of the restricted passageway to that of the elongated passageway being at least as great as the degree of expansion of said rubber stock whereby the reinforcing elements is caused to form folds when the stock initially leaves said restricted passage which folds are caused to straighten upon the expansion of the stock due to blowing in the longitudinal direction.

References Cited in the file of this patent

UNITED STATES PATENTS

| | | |
|---|---|---|
| 1,780,122 | Felix | Oct. 28, 1930 |
| 2,537,977 | Dulmage | Jan. 16, 1951 |
| 2,538,406 | Allen | Jan. 16, 1951 |
| 2,581,769 | Olson | Jan. 8, 1952 |
| 2,649,618 | Rhodes et al. | Aug. 25, 1953 |
| 2,683,285 | Ramsey | July 13, 1954 |
| 2,688,153 | Gebauer et al. | Sept. 7, 1954 |
| 2,742,669 | Rhodes | Apr. 24, 1956 |
| 2,754,543 | Loew | July 17, 1956 |
| 2,817,875 | Harris et al. | Dec. 31, 1957 |
| 2,835,927 | Henning | May 27, 1958 |

UNITED STATES PATENT OFFICE
CERTIFICATE OF CORRECTION

Patent No. 3,030,623                                April 17, 1962

Henry J. Lehti et al.

It is hereby certified that error appears in the above numbered patent requiring correction and that the said Letters Patent should read as corrected below.

Column 6, line 14, for "perimts" read -- permits --; line 40, for "elements" read -- element --.

Signed and sealed this 14th day of August 1962.

(SEAL)
Attest:

ERNEST W. SWIDER                                DAVID L. LADD
Attesting Officer                                    Commissioner of Patents